United States Patent [19]

Hanano

[11] Patent Number: 5,383,775
[45] Date of Patent: Jan. 24, 1995

[54] POWDERY MOLD RELEASE AGENT SPRAY DEVICE

[75] Inventor: Takashi Hanano, Kobe, Japan
[73] Assignee: Hanano Corporation, Kobe, Japan
[21] Appl. No.: 191,112
[22] Filed: Feb. 3, 1994
[30] Foreign Application Priority Data Mar. 16, 1993 [JP] Japan .................. 5-055602

[51] Int. Cl.⁶ .............................................. B29C 45/83
[52] U.S. Cl. ...................................... 425/91; 118/308;
264/214; 425/92; 425/95; 425/100; 425/107;
425/DIG. 50; 425/DIG. 115
[58] Field of Search ............... 425/91, 92, 95, 98,
425/100, 107, DIG. 50, DIG. 115; 264/214;
118/308

[56] References Cited

U.S. PATENT DOCUMENTS

| | | | |
|---|---|---|---|
| 3,645,319 | 2/1972 | Pondelicek et al. | 425/107 |
| 4,009,978 | 3/1977 | Hanning | 425/98 |
| 4,420,028 | 12/1982 | Nelson | 425/107 |
| 4,472,451 | 5/1984 | Mulder | 425/98 |
| 4,605,170 | 8/1986 | Thurner | 425/100 |

FOREIGN PATENT DOCUMENTS

| | | | |
|---|---|---|---|
| 0406753 | 1/1991 | European Pat. Off. | 425/98 |
| 63-5915 | 1/1988 | Japan | 425/98 |
| 2039246 | 8/1980 | United Kingdom | 425/98 |

*Primary Examiner*—Khanh Nguyen
*Attorney, Agent, or Firm*—Foley & Lardner

[57] ABSTRACT

A powdery mold release agent spray device including a nozzle having spray ports on its tip end side wall, a nozzle having spray ports on its tip end surface and shut pins, all of which are assembled in through holes made on both metal molds. The spray ports of the former and latter nozzles are exposed to cavity inside at time of spraying work, the spray ports of the former and latter nozzles are located in the through holes and the cavity is isolated from the spray ports of the latter nozzle by the shut pin. By using this spray device, a powdery mold release agent can be sprayed onto inside surfaces of the metal molds without exception, economically and without worsening a work environment.

2 Claims, 3 Drawing Sheets

POWDERY MOLD RELEASE AGENT SPRAY DEVICE

BACKGROUND ART

1. Industrial Useful Field

This invention relates to a powdery mold release agent spray device which can spray a powdery mold release agent onto inside surfaces of metal molds without exception under a state where the metal molds are closed.

2. Prior Art and its Problem

Conventionally, the metal molds have been opened and the mold release agent has been sprayed by inserting a nozzle in between metal molds, in order to spray the powdery mold release agent onto inside surfaces of metal mold. In this method, however, since it has been difficult to make the nozzle get near to the inside surfaces of the metal molds, the powdery mold release agent has not been sprayed sufficiently onto hidden portions such as backsides of core etc. so that nonuniformity of adhesion has occurred easily and a consumption of mold release agent has increased to cause wasteful use of it. Further, there has been a problem of worsening of work environment due to flying-around of mold release agent.

OBJECT OF THE INVENTION

An object of this invention is to provide a powdery mold release agent spray device which can spray a mold release agent onto inside surfaces of metal molds without exception, economically and without worsening a work environment.

SUMMARY OF THE INVENTION

In a spray device for spraying a powdery mold release agent onto inside surfaces of metal molds under closed state; a powdery mold release agent spray device comprising two kinds of nozzles for spraying the powdery mold release agents, shut pins, and drive mechanisms for moving these components forward and backward, in which the nozzles and the shut pins fit in and are slidable within holes passing through the metal molds under closed state, one-side nozzle has spray ports on a tip end side wall, the other-side nozzle has spray ports on a tip end surface, the shut pins are adapted to be slidable in through holes intersecting a through hole in which the other-side nozzle fits, the one-side nozzle is so driven that its spray ports are exposed to a cavity inside at time of a spraying work and a tip end surface forms a surface flush with the inside surface of metal mold at time of a filling work, the other-side nozzle is so driven that its spray ports are exposed to the cavity inside at time of the spraying work and the tip end surface comes in the foregoing through hole of metal mold at time of the filling work, and the shut pin is so driven that it comes in the foregoing through hole of the other-side nozzle to isolate the cavity from the tip end surface of the other-side nozzle and the side wall exposed to the cavity side forms a surface flush with the inside surface of metal mold at time of the filling work and it retracts from the foregoing through hole of the other-side nozzle at time of the spraying work.

The present invention performs the following functions and effects.

(1) Since two kinds of nozzles having spray ports formed at different positions each other are used, hidden portions viewing from the spray ports of nozzles can be easily prevented from being created.

(2) Since the nozzles are assembled in the metal molds and spraying is carried out with the spray ports exposed to the cavity inside of metal molds under closed state, the spraying is carried out at positions very close to the inside surfaces of metal molds. Consequently, a consumption of powdery mold release agent becomes economical.

(3) Since the spraying is carried out under the state where the metal molds are closed, the powdery mold release agent does not fly around an outside.

(4) Since the spray ports are not exposed to the cavity inside at time of the filling work, there is no chance for the spray ports to be clogged by molten metal.

(5) Since the tip end surface of the foregoing one-side nozzle is flush with the inside surface of metal mold and the side wall exposed to the cavity side of shut pin is flush with the inside surface of metal mold at time of the filling work, there is no possibility that irregularities out of control, which are caused by the nozzles and shut pins installed, are formed on surfaces of cast product.

DETAILED DESCRIPTION OF THE INVENTION

An embodiment of this invention will be described hereunder with reference to drawings.

Figure 1:
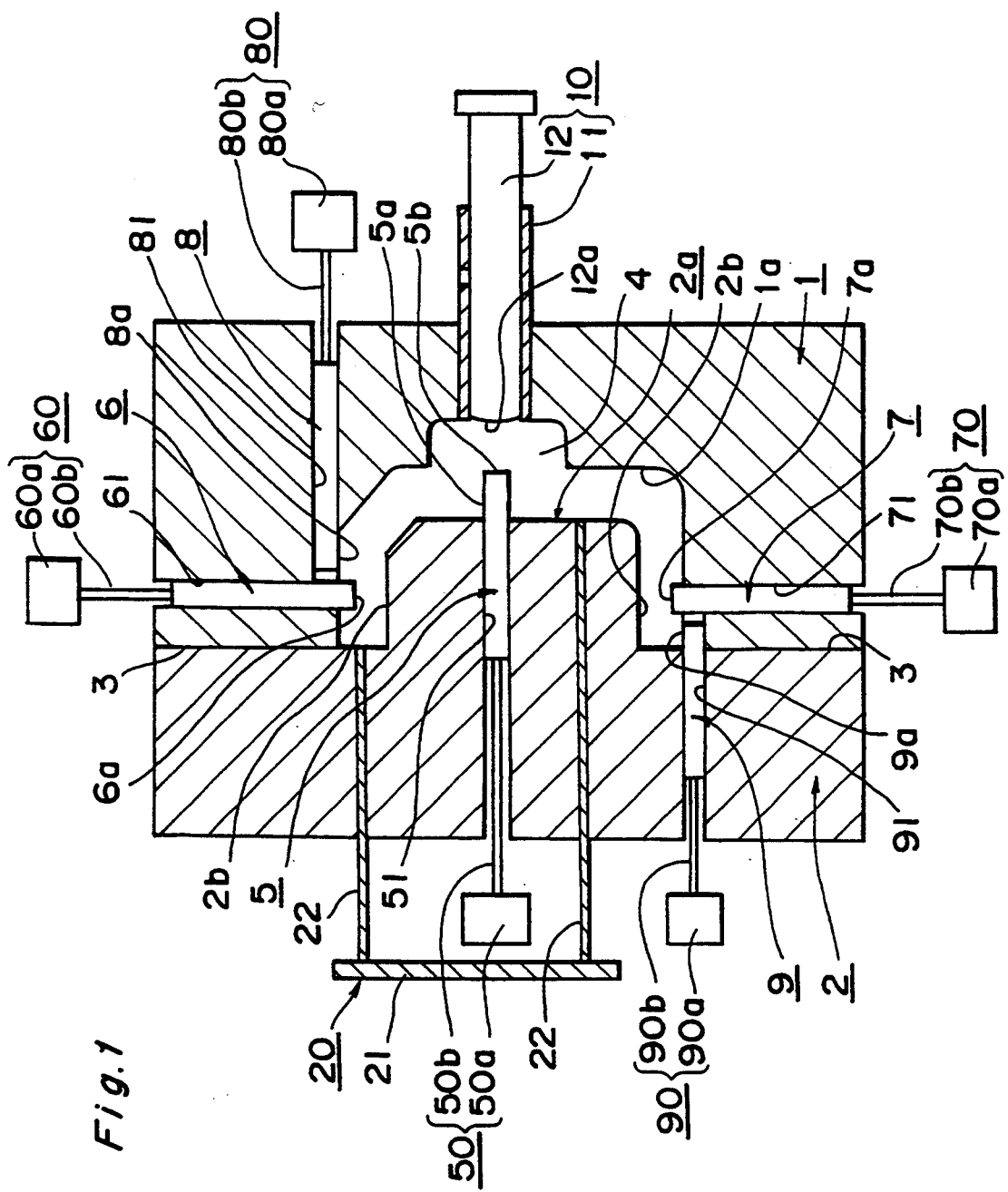
FIG. 1 is a schematic vertical sectional view showing a state of spraying work of a cast device equipped with a powdery mold release agent spray device of this invention.
Figure 2:
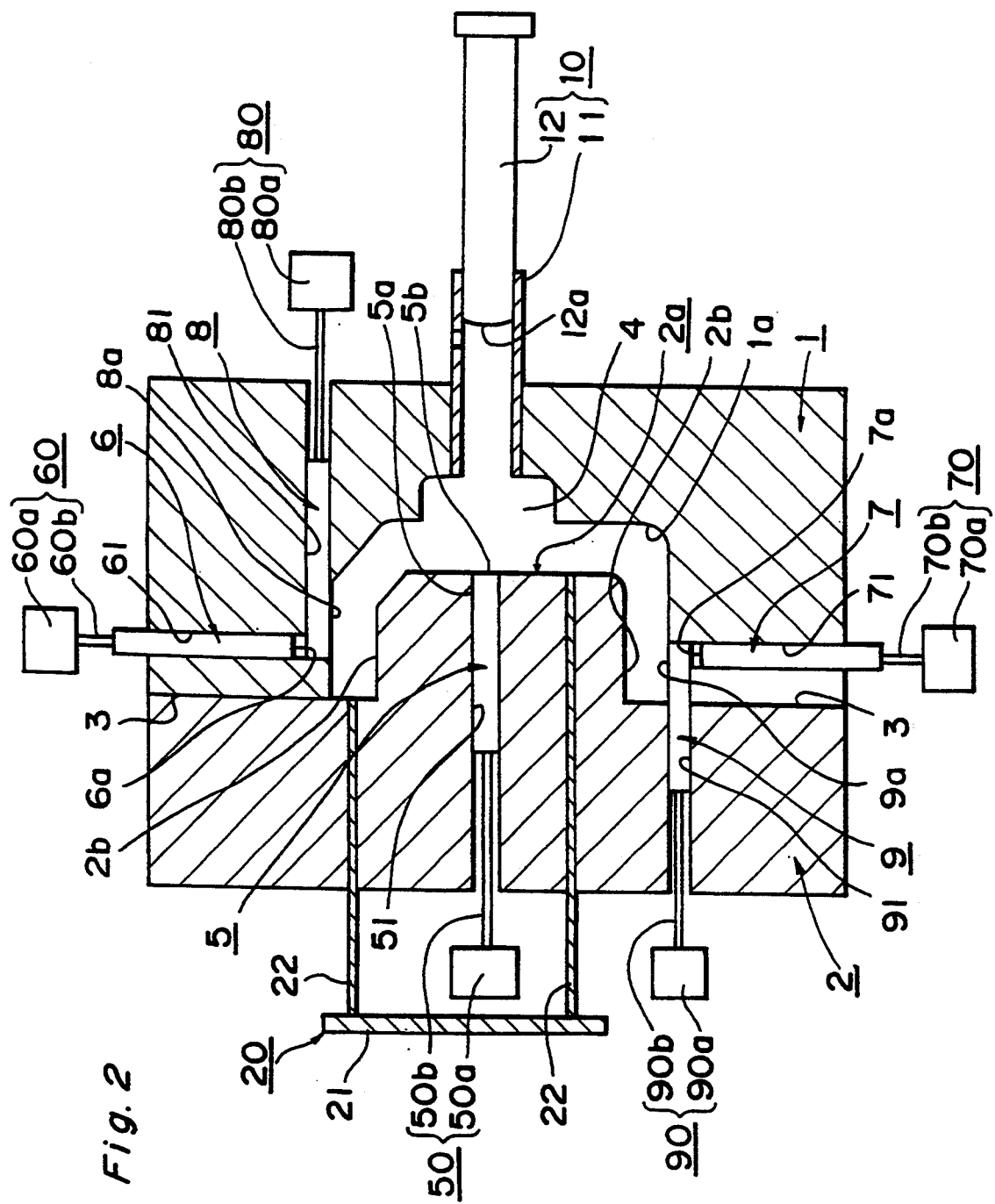
FIG. 2 is a schematic vertical sectional view showing a state of filling work of a cast device equipped with a powdery mold release agent spray device of this invention.
Figure 3:
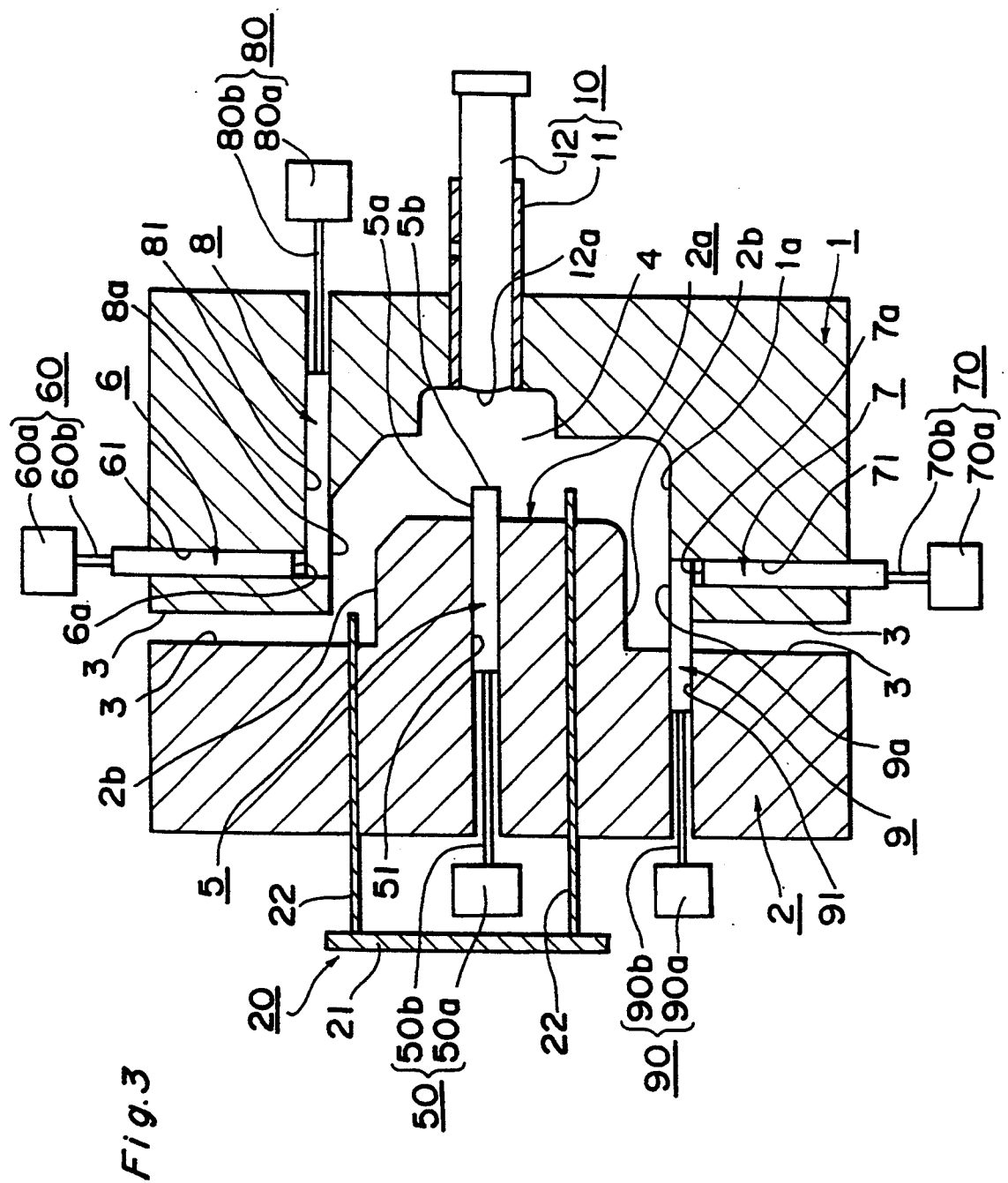
FIG. 3 is a schematic vertical sectional view showing a state of cast product take-out work of a cast device equipped with a powdery mold release agent spray device of this invention.

FIG. 1 through FIG. 3 are schematic vertical sectional views showing respective working states of the case device equipped with the powdery mold release agent spray device of this invention. FIG. 1 shows the state of spraying work, FIG. 2 shows the state of filling work, and FIG. 3 shows the state of cast product take-out work, respectively. This cast device is of a type in which the metal molds are opened left and right.

In these figures, 1 is a stationary metal mold and 2 is a movable metal mold which are held by separate holders (not shown) respectively, and they are adapted to be opened left and right together with the holders. 3 is a mating surface of the both metal molds 1 and 2, and 4 is a cavity.

The powdery mold release agent spray device of this invention is assembled in the both metal molds 1 and 2. This spray device is equipped with two kinds of nozzles 5, 6 and 7, shut pins 8 and 9, and drive mechanisms 50, 60, 70, 80 and 90 which move these components forward and backward respectively. A kind of the nozzle 5 is different from that of the nozzles 6 and 7 in the point that positions, where spray ports are formed, are different each other. 10 is a filling portion which is composed of a sleeve 11 and a plunger 12. 20 is a cast product push-out mechanism which is composed of a push-out plate 21 and plural push-out pins 22 integrated with the plate 21. The drive mechanisms 50, 60, 70, 80 and 90 consist of motored cylinder mechanisms 50a, 60a, 70a, 80a and 90a and rods 50b, 60b, 70b, 80b and 90b.

The nozzle 5 has plural spray ports on its tip end side wall 5a. The nozzle 5 slidably fits in a through hole 51 formed at an approximately central part of the movable metal mold 2 in horizontal direction, and is adapted to be moved forward and backward by the drive mechanism 50 within the through hole 51.

The nozzle 6 has plural spray ports on its tip end surface 6a. The nozzle 6 slidably fits in a through hole 61 formed on an upper part of the stationary metal mold 1 in vertical direction, and is adapted to be moved forward and backward by the drive mechanism 60 within the through hole 61. The nozzle 7 also has plural spray ports on its tip end surface 7a, slidably fits in a through hole 71 formed on a lower part of the stationary metal mold 1 in vertical direction, and is adapted to be moved forward and backward by the drive mechanism 70 within the through hole 71.

The nozzles 5, 6 and 7 are so installed that hidden portions viewing from the spray ports of the nozzles 5, 6 and 7 are not created on inside surfaces 1a and 2a of the both metal molds 1 and 2.

The shut pin 8 slidably fits in a through hole 81 formed on an upper part of the stationary metal mold 1 in horizontal direction, and is adapted to be moved forward and backward by the drive mechanism 80 within the through hole 81. The through hole 81 intersects at its tip end with a tip end of the through hole 61. The shut pin 8 and the through hole 81 are so formed that a side wall 8a of tip end of the shut pin 8 becomes flush with an inside surface 1a of the stationary metal mold 1 when the tip end of the shut pin 8 comes in the through hole 61. Exactly speaking, an intersecting portion of the through hole 61 with the through hole 81 is formed into a grooved shape.

The shut pin 9 slidably fits in a through hole 91 formed on lower parts of the both metal molds 1 and 2 under closed state in horizontal direction, and is adapted to be moved forward and backward by the drive mechanism 90 within the through hole 91. The through hole 91 is made up under the state where the both metal molds 1 and 2 are closed, and intersects at its tip end with a tip end of the through hole 71. The shut pin 9 and the through hole 91 are so formed that a side wall 9a of tip end of the shut pin 9 becomes flush with the inside surface 1a of the stationary metal mold 1 when the tip end of the shut pin 9 comes in the through hole 71. Exactly speaking, an intersecting portion of the through hole 71 with the through hole 91 is formed into a grooved shape.

The drive mechanisms 50, 60, 70, 80 and 90 are adapted to be controlled by a control portion (not shown) in the following manners. The drive mechanism 50 drives the nozzle 5 in such a way that the spray ports are exposed to the cavity 4 inside at time of the spraying work (FIG. 1) and the tip end surface 5b forms a surface flush with an inside surface 2a of the movable metal mold 2 at time of the filling work (FIG. 2). The drive mechanism 60 drives the nozzle 6 in such a way that the spray ports are exposed to the cavity 4 inside at time of the spraying work (FIG. 1) and a tip end surface 6a comes in the through hole 61 at time of the filling work (FIG. 2). The drive mechanism 70 drives the nozzle 7 in such a way that the spray ports are exposed to the cavity 4 inside at time of the spraying work (FIG. 1) and a tip end surface 7a comes in the through hole 71 at time of the filling work (FIG. 2). The drive mechanism 80 drives the shut pin 8 in such a way as to make it come in the through hole 61 inside to isolate the cavity 4 from the tip end surface 6a of the nozzle 6 and allow a side wall 8a to form a surface flush with the inside surface 1a of the stationary metal mold 1 at time of the filling work (FIG. 2), and to make the shut pin 8 retract from the through hole 61 at time of the spraying work (FIG. 1). The drive mechanism 90 drives the shut pin 9 in such a way as to make it come in the through hole 71 inside to isolate the cavity 4 from the tip end surface 7a of the nozzle 7 and allow a side wall 9a to form a surface flush with the inside surface 1a of the stationary metal mold 1 at time of the filling work (FIG. 2), and to make the shut pin 9 retract from the through hole 71 at time of the spraying work (FIG. 1).

Function will be described hereunder.

The spraying work is carried out under the state where the nozzles 5, 6 and 7 and the shut pins 8 and 9 are located as shown by FIG. 1. Namely, the both metal molds 1 and 2 are in closed state. The nozzle 5 is exposed to the cavity 4 inside at its tip end side wall 5a i.e. the spray ports. The nozzles 6 and 7 are exposed to the cavity 4 inside at its tip end surfaces 6a and 7a i.e. the spray ports. The shut pins 8 and 9 retract from the through holes 61 and 71 respectively. The push-out pin 22 comes in the movable metal mold 2, and a tip end surface 12a of the plunger 12 becomes flush with the inside surface 1a of the stationary metal mold 1.

When the powdery mold release agent is sprayed from the nozzles 5, 6 and 7 under the state as described above; the powdery mold release agent is sprayed from the nozzle 5 in vertical direction, it is sprayed from the nozzle 6 in a lower direction, and it is sprayed from the nozzle 7 in an upper direction. When the spraying is done from the nozzle 5 only, there is a possibility that the powdery mold release agent does not spread to the inside surface 2b which is a portion hidden from the nozzle 5. However, since the spray ports of the nozzles 6 and 7 face on the inside surface 2b, the powdery mold release agent can be sprayed onto the surface from the nozzles 6 and 7. Therefore, the powdery mold release agent can be sprayed without exception onto the inside surfaces 1a and 2a from the nozzles 5, 6 and 7.

Further, since the powdery mold release agent is sprayed from the nozzles 5, 6 and 7 at positions very close to the inside surfaces 1a and 2a, the powdery mold release agent can be sprayed with a good efficiency. Accordingly, the consumption of powdery mold release agent becomes very economical.

Moreover, since the powdery mold release agent is sprayed under the state where the both metal molds 1 and 2 are closed, there is no chance for the the powdery mold release agent to fly around the outside of the cast device. Therefore, there is no possibility that the work environment is worsened.

After completion of the spraying work, the filling work is carried out with the nozzles 5, 6 and 7 and the shut pins 8 and 9 located at respective positions of FIG. 2. Namely, the both metal molds 1 and 2 are naturally in closed state. The tip end surface 5b of the nozzle 5 becomes flush with the inside surface 2a of the movable metal mold 2. The tip end surface 6a of the nozzle 6 comes in the through hole 61, and the tip end of the shut pin 8 comes in the through hole 61. Thereby, the cavity 4 and the tip end surface 6a are isolated each other by the shut pin 8. The tip end surface 7a of the nozzle 7 comes in the through hole 71, and the tip end of the shut pin 9 comes in the through hole 71. Thereby, the cavity and the tip end surface 7a are isolated each other by the shut pin 9. The tip end side walls 8a and 9a of the shut pins 8 and 9 become flush with the inside surface 1a of the stationary metal mold 1.

Under the state as described above, molten metal fed in the sleeve 11 is pushed out by the plunger 12 to be filled in the cavity 4. The spray ports of the nozzle 5 are located in the through hole 51 because the tip end surface 5b is flush with the inside surface 2a, so that there is no chance for the spray ports to contact with the molten metal and to be clogged with the molten metal. The spray ports of the nozzles 6 and 7 are isolated from the cavity 4 by the shut pins 8 and 9, so that there is no chance for the spray ports to contact with the molten metal and to be clogged with the molten metal Therefore, it is not necessary to mind cloggings of the nozzles 5, 6 and 7 with the molten metal so that continuous use of them becomes possible.

In addition, the tip end surface 5b of the nozzle 5 is flush with the inside surface 2a and the tip end side walls 8a and 9a of the shut pins 8 and 9 are flush with the inside surface 1a of the stationary metal mold 1, so that there is no possibility that the irregularities out of control, which are caused by the installed nozzles 5, 6 and 7 and the shut pins 8 and 9, are produced on surfaces of cast product.

The cast product is taken out under a state of FIG. 3. Namely, when the movable metal mold 2 is moved to open the both metal molds 1 and 2 with the state of FIG. 2 left as it is, the push-out pin 22 and the nozzle 5 protrude from the inside surface 2a. Thereby, release of the cast product from the inside surface 2a is accelerated.

EFFECT OF THE INVENTION

As described above, according to the powdery mold release agent spray device of this invention, the following effects can be obtained.

(1) The powdery mold release agent can be sprayed without exception onto the inside surfaces 1a and 2a of the both metal molds 1 and 2.

(2) The consumption of powdery mold release agent can be made economical.

(3) The worsening of work environment can be avoided.

(4) The nozzles 5, 6 and 7 can be prevented from being clogged with the molten metal, so that they can be used continuously.

(5) The formation of irregularities out of control on the cast product can be avoided, which are caused by the installed nozzles 5, 6 and 7 and the shut pins 8 and 9.

ANOTHER EMBODIMENT

The powdery mold release agent spray device of this invention can also be applied to a cast device of a type in which the metal molds are opened upward and downward.

The two kinds of nozzles are not necessarily be arranged as described in the above embodiment. They may be arranged at will provided that hidden portions viewing from the spray ports of the nozzles are not created on the inside surfaces of the both metal molds, in the same way as the above embodiment. Further, the number of nozzle may be at will in order to accomplish such arrangement.

The number of shut pin corresponds to the number nozzle having the spray ports at the tip end surface in the above embodiment, however, only one shut pin may be used for common use by plural nozzles.

What is claimed is:

1. A spray device for spraying a powdery mold release agent onto molding surfaces of a mold cavity defined by metal molds when the molds are in a closed position wherein the spray device comprises:
   (a) at least one first nozzle having spray ports on a tip end side surface and reciprocating within a first channel formed in the mold,
   (b) means for reciprocating the first nozzle between a spraying position in which the tip end side surface of the first nozzle extends into the molding cavity and a retracted position in which a tip end surface of the first nozzle is flush with the molding surface,
   (c) at least one second nozzle having spray ports on a tip end surface and reciprocating within a second channel formed in the mold,
   (d) at least one shut pin reciprocating within a passage wherein the second channel intersects the passage, and
   (e) means for reciprocating the second nozzle and the shut pin between a spraying position in which the tip end surface of the second nozzle extends into the mold cavity and a retracted position in which the shut pin extends into the second channel to isolate the tip end surface of the second nozzle from the mold cavity and an outer surface of the shut pin is flush with the molding surface.

2. A spray device for spraying a powdery mold release agent onto molding surfaces of a mold cavity defined by metal molds when the molds are in a closed position wherein the spray device comprises:
   (a) one first nozzle having spray ports on a tip end side surface and reciprocating within a first channel formed in the mold,
   (b) means for reciprocating the first nozzle between a spraying position in which the tip end side surface of the first nozzle extends into the molding cavity and a retracted position in which a tip end surface of the first nozzle is flush with the molding surface,
   (c) two second nozzles having spray ports on tip end surfaces and reciprocating within two second channels formed in the mold,
   (d) two shut pins reciprocating within two passages wherein each of said second channels intersects each of said passages, and
   (e) means for reciprocating the second nozzles and the shut pins between a spraying position in which the tip end surfaces of the second nozzles extend into the mold cavity and a retracted position in which each of the shut pins extends into each of the second channels to isolate each of the tip end surfaces of the second nozzles from the mold cavity and outer surfaces of the shut pins are flush with the molding surface.

* * * * *